Patented Sept. 1, 1925.

1,552,024

UNITED STATES PATENT OFFICE.

WILLIAM H. ALTON, OF NEW YORK, N. Y., ASSIGNOR, BY MESNE ASSIGNMENTS, TO A. C. BATTELLE, OF CHICAGO, ILLINOIS.

PROCESS OF MAKING AMORPHOUS ARTIFICIAL CALCIUM CARBONATE.

No Drawing.   Application filed October 21, 1919. Serial No. 332,337.

*To all whom it may concern:*

Be it known that I, WILLIAM H. ALTON, a citizen of the United States, residing at New York, county and State of New York, have made a certain new and useful invention in a Process of Making Amorphous Artificial Calcium Carbonate, of which the following is a specification.

This invention relates particularly to artificial calcium carbonate for use as a filler material or body for various commercial products and the process of making the same. Contrary to the usual expectations, this artificial product is produced in an amorphous state as distinguished from a crystalline condition, which unexpected result may be the result of some form of catalytic action, due to the materials used, or it may, in part, be due to synthesis.

It has long been a common practice to employ whiting as a filler or body in the manufacture of various commercial products. Whiting for this purpose occurs in certain localities of the world in a natural state, one important source being the Channel coast of England. As thus obtained in nature the product is more or less in amorphous condition and such product is used extensively for various industrial purposes, such for example, as a body or filler for putty, paint, glue, mucilage, soap, ink, rubber, etc.

Various attempts have been made to produce a calcium carbonate product from the waste lime sludge of soda causticizing processes employed in paper pulp mills, soap factories, and other industrial establishments. The product obtained from this source, however, has been of a crystalline nature instead of being amorphous with the result that such crystalline product is unsuitable by reason of its crystalline character for use as a body or filler in the manufacture of many products where such use is desired. For example, I have found that in the use of a crystalline form of product the particles present minute crystals sometimes with plain contacting surfaces, sometimes with round corners, which have no especially cohesive strength, and when used as a body or filler for putty, for example, these particles having no coherence with each other quickly pull apart one from another and hence greatly weaken the tensile strength of the material for which such crystalline product forms a body. On the other hand, in the case of an amorphous structure of calcium carbonate, such for example, as the English whiting, each particle or grain instead of having flat surfaces and rounded corners without coherence with one another, are formed with more or less feather-like edges similar to the formation of a snow flake, or are formed with little spines similar to those along the back of a caterpillar, and when these particles of the amorphous structure are thrown or pressed together in conjunction with a vehicle of some kind, as for instance, with rubber or putty, these feather-like edges or spines interengage or intertwine with each other and become interlaced together, thereby forming a bonding union which greatly adds to the tensile strength of the composition of which it forms a body. The whiting product obtained from England, however, is more or less expensive and difficult to obtain. Moreover, I have discovered that an amorphous artificial calcium carbonate product may be obtained from the waste materials of soda causticizing processes as employed commercially in this country, and also such an amorphous product may be produced artificially by the proper use and manipulation of sodium carbonate or soda ash and lime either in its oxide or hydrate form. An artificial amorphous calcium carbonate product and the method I have discovered for producing such product, constitutes the special purposes of my present invention.

In carrying out my invention I have discovered that when a solution of sodium carbonate or soda ash and lime, either in its oxide or hydrate form, is treated under the special conditions of control which I have discovered, an amorphous artificial calcium carbonate similar in character to the natural English whiting but differing in some respects from the natural product, results, and whether the solution referred to is produced directly from sodium carbonate or soda ash and lime or whether the lime sludges or residues of soda causticizing processes at present extensively employed in various lines of manufacture are used.

In accordance with my invention the sodium carbonate or soda ash solution with the lime added thereto, whether specially prepared for the manufacture of the amorphous artificial calcium product or whether prepared for use as a soda causticizing solution, is subjected to a treatment and control according to two principal governing factors, namely, first, the relative proportions of soda ash and lime, and, second, to the length of time during which the reaction of these agents is permitted to proceed. I have found that the relative proportional amounts of the soda ash and lime varies more or less according to the purity of the lime and the strength or density of the soda ash liquor. Likewise, I have found that the length of time during which the chemical reaction is permitted to proceed varies in like manner with the purity of the lime and the density of the soda ash liquor employed. In the case of lime of the ordinary commercial purity and a density of soda ash solution of approximately 14° B. to 20° B. I have found that I am enabled to secure good results by employing the soda ash solution and lime in the following relative proportions, namely, 500 cubic centimeters of the solution and twenty grams of lime, the mixture being subjected to a temperature of, for example, 200° F. for a period of three hours. I have found that the temperature may be varied throughout a wide range from atmospheric temperature up to the boiling point of water. The heat hastens the reaction and may usually be supplied by injecting steam into the solution and the particular degree of heat varies with the particular conditions encountered, and particularly in the case where the solution is to be employed as a soda causticizing solution in the manufacture of paper pulp, soap, and the like. The time during which the chemical reaction is permitted to proceed likewise may be varied throughout a range of from one to five hours.

I have found that ordinarily in the use of soda causticizing solutions in the industries the tendency is to employ such relative proportions of soda ash and lime that the calcium carbonate product from such solutions becomes of crystalline character. The natural tendency where such solution is to be employed in paper pulp and soap manufacturing and other purposes is to increase the amount of lime in order to hasten the operation. However, I have discovered that by properly proportioning the amount of lime according to its condition of purity and the condition of density of the soda ash liquor or solution not only is the desired rapidity of paper pulp or soap manufacture rendered satisfactory and a large saving is effected in the amount of lime, but also I am enabled under the conditions of control I have above described to secure an artificial calcium carbonate product which is amorphous instead of crystalline form.

After the lime and soda ash solution are added together the resulting substance is agitated and subjected to the desired degree of heat for the desired period of time, examples of which are above given. The action is then arrested and the liquor is then drawn off or filtered. The residue is then substantially freed from sodium compound in any suitable manner, for example, by washing it in fresh water until only a trace of the sodium compounds, soda ash, or the like, remains. The mass is then dried and is ready for use as a filler or body in the manufacture of various articles of commerce.

As above explained if too much lime is employed, or if the chemical reaction is permitted to proceed for too great a length of time the resulting product is of crystalline character which is detrimental and which I avoid by my invention. When the relative amount of lime employed is in the proper proportion to the quantity and density of the soda ash liquor and the proper conditions of temperature and time of reaction are observed the resulting product is an amorphous calcium carbonate which is, while closely similar to the natural English whiting product, not only in appearance but also in a test of light refraction, still when compared with the English whiting natural product under a specially constructed powerful microscope the amorphous artificial product of my invention is found to be free from the hard shell-like frame portions or particles of infinitesimal size which will be found to characterize the natural English whiting product and consequently the amorphous artificial product of my invention differs structurally in this respect from the natural product.

The amorphous artificial product of my invention can be readily distinguished visually from the artificial crystalline products heretofore obtained by the simple expedient of comparing the appearance of transparent or glass containers or test tubes formed with straight sides or surfaces and containing respectively the crystalline and the amorphous products. By shaking down such a tube or container containing the amorphous product of my invention the mass or powder will fall into an apparently granular formation of more or less irregular size ranging from that of a mustard seed up to that of a pea or larger and occasionally showing crevices and interstices of irregular shape presenting generally the appearance of granular phosphate of soda, whereas, in the case of the artificial crystalline product the mass will lie with flat and unbroken faces against the sides of the glass container, presenting a solid and smooth face against the surface of the container.

In carrying out my invention, whether I employ a solution of caustic soda and lime specially prepared for the purpose, or the causticizing solution from pulp and other mills, I do not find it necessary to preliminarily eliminate from such solution any soluble constituent or soluble foreign matter contained therein, as I find the presence of any such constituent or foreign matter is not objectionable and does not materially affect the product. I am thus enabled to eliminate unnecessary steps and operations, thereby securing great economy in the production of an amorphous product.

I have found that an amorphous product obtained artificially as above described does not possess the quality of absorbing linseed or other oils with the same degree as the crystalline product, and hence the utilization of my amorphous product for various industrial purposes is very much more economical than that of the crystalline product, without impairing its utility as a body or extender, even where employed with such oils. This difference in characteristic of my product can be easily demonstrated by mixing the same as a body for putty and comparing the tensile strength of the resulting mass with a similar mass formed with a crystalline body.

So far as I am aware I am the first to succeed in producing in the manner above described an artificial calcium carbonate possessing the charactertistic of being amorphous as distinguished from a crystalline form of product.

Having now set forth the object and nature of my invention and the manner of carrying the same into operation, what I claim as new and useful and of my own invention and desire to secure by Letters Patent is:—

1. The process which consists in mixing together lime in the proportion of twenty grams and a solution of sodium carbonate in proportion of five hundred cubic centimeters of density 14 to 20° B., and subjecting the mixture to agitation and heat to a temperature not exceeding 200° F. for a period of approximately three hours, and finally washing and drying the resulting product.

2. The method of manufacturing amorphous calcium carbonate which consists in mixing together twenty grams of lime with five hundred cubic centimeters of a solution of sodium carbonate of density approximately 20° B. and subjecting the resulting mixture to agitation at a temperature not exceeding 200° F. for a period of time up to three hours, then interrupting the reaction and washing and drying the precipitate.

In testimony whereof I have hereunto set my hand on this 16th day of October A. D. 1919.

WILLIAM H. ALTON.